Sept. 20, 1949.　　　　　A. BAKER　　　　　2,482,146
BATTER DISPENSING CART FOR BAKING APPARATUS
Filed May 22, 1945　　　　　　　　　　　3 Sheets-Sheet 1
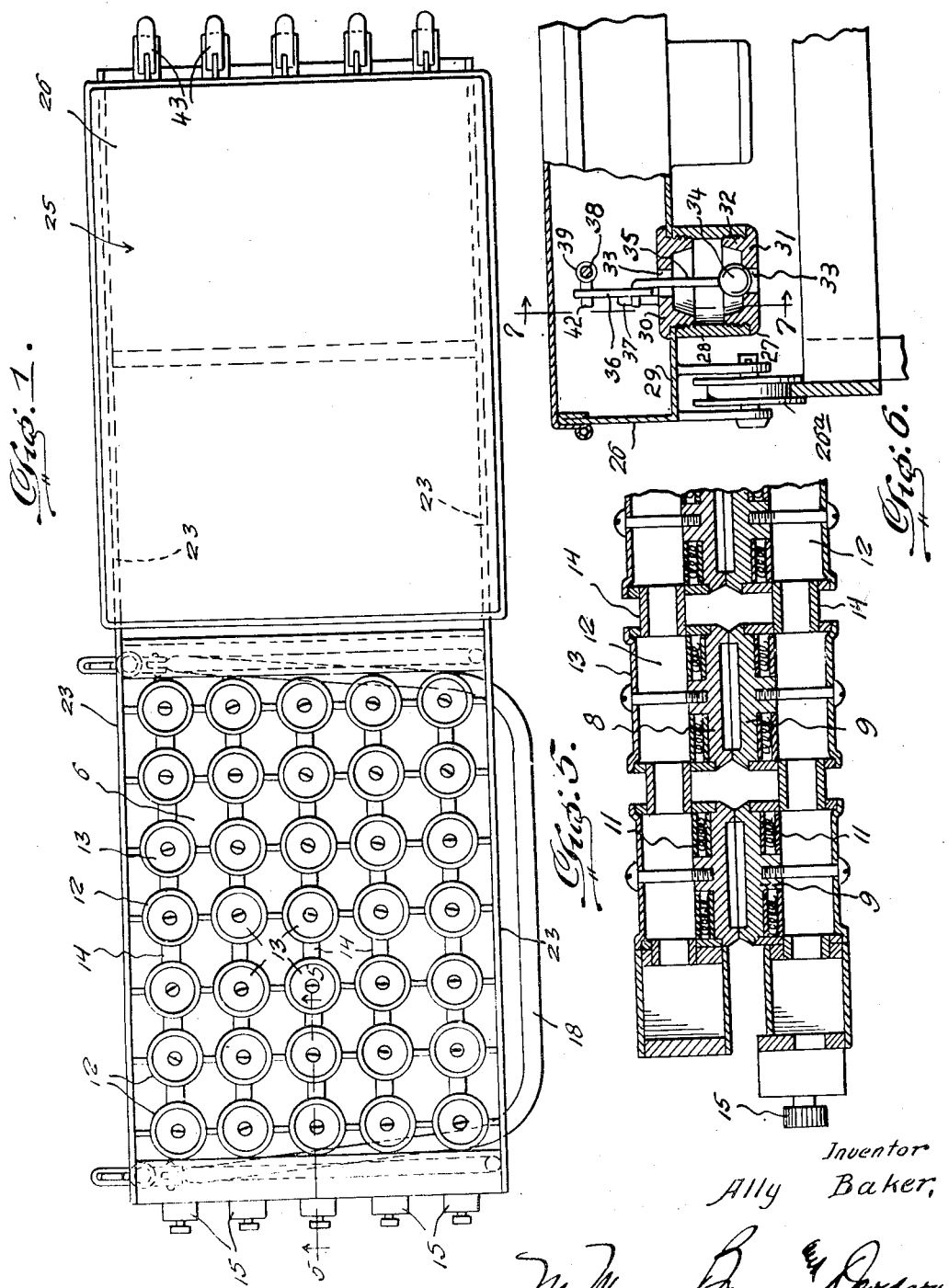
Inventor
Ally Baker,

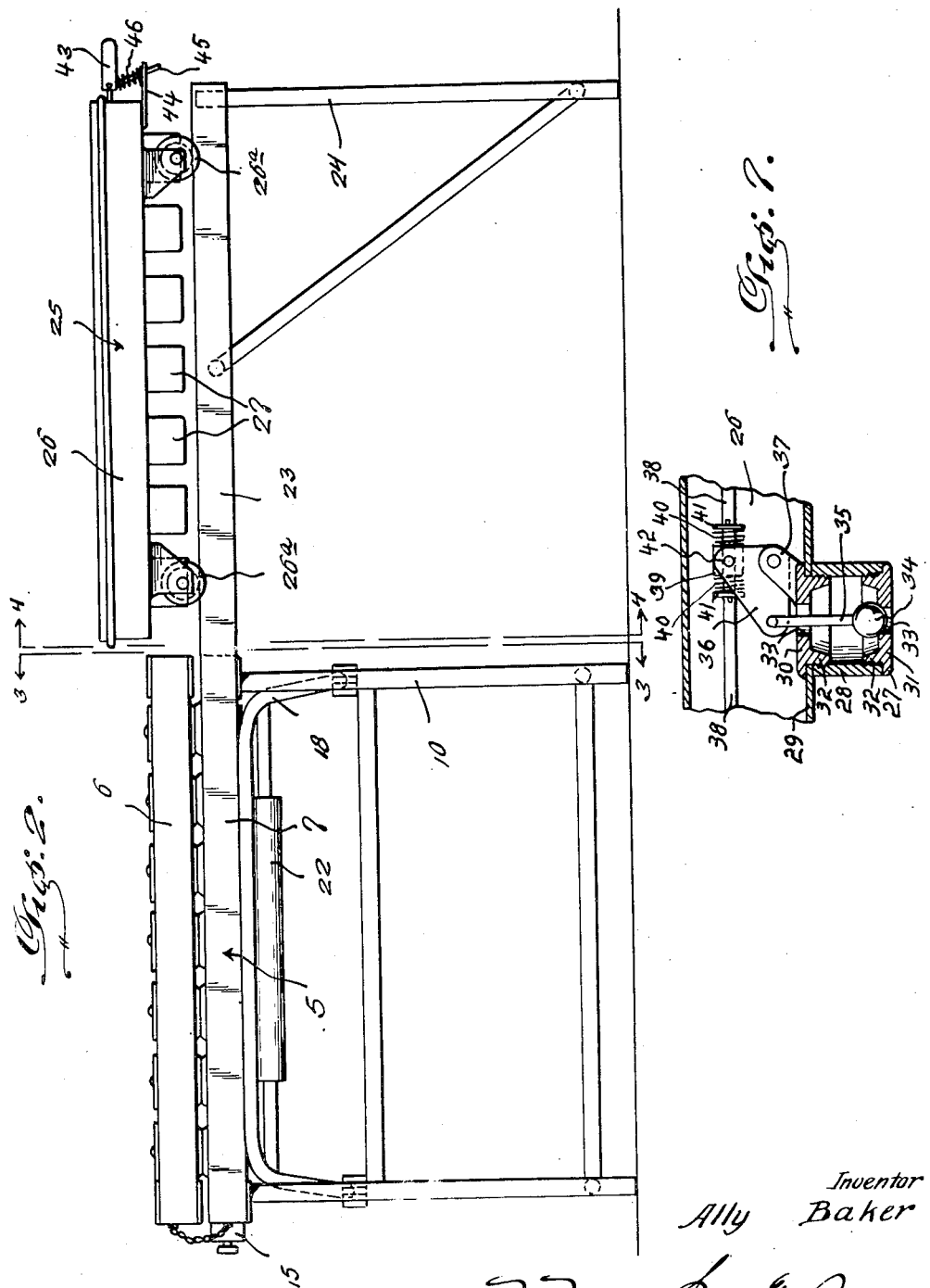

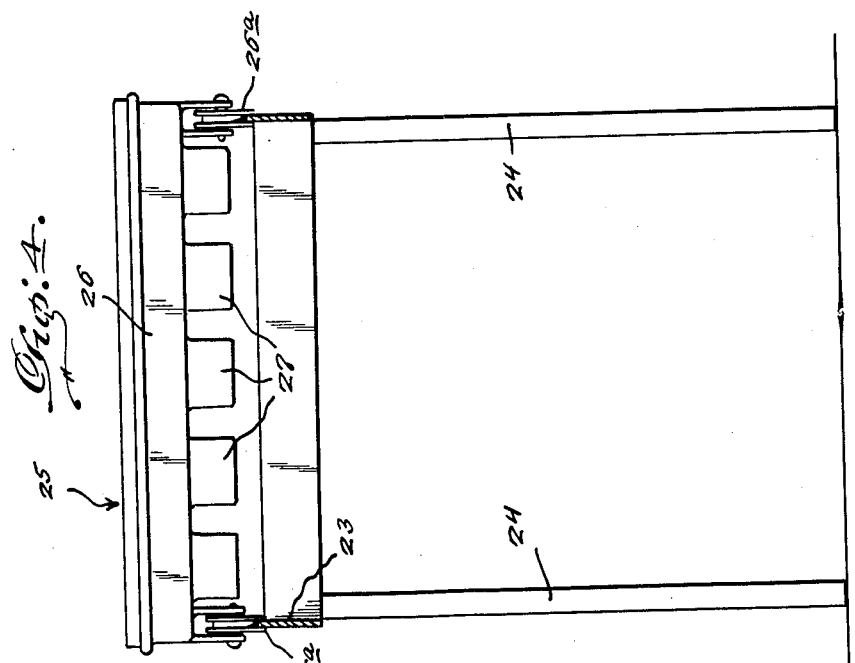
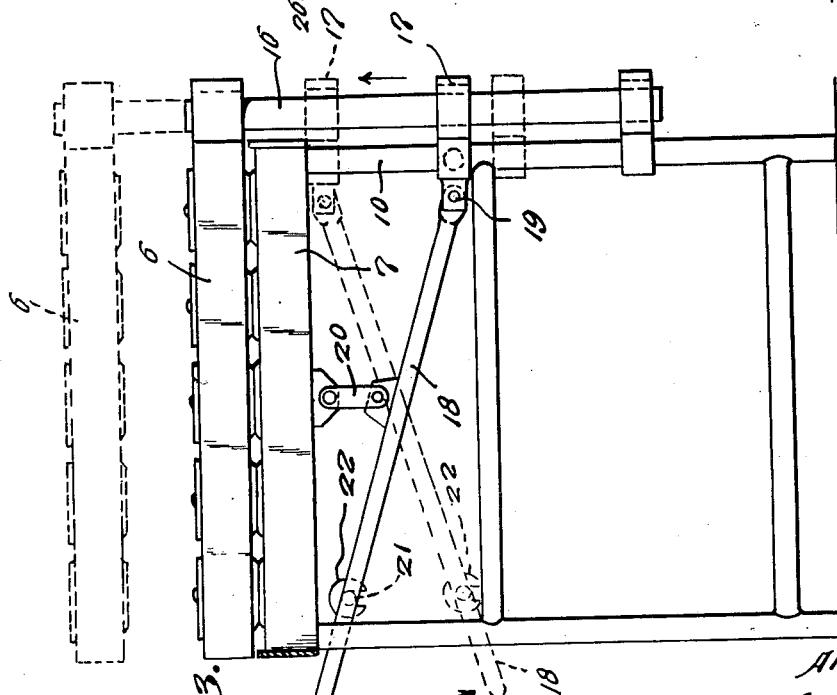

Patented Sept. 20, 1949

2,482,146

UNITED STATES PATENT OFFICE 2,482,146

BATTER DISPENSING CART FOR BAKING APPARATUS

Ally Baker, Chicago, Ill.

Application May 22, 1945, Serial No. 595,201

2 Claims. (Cl. 107—66)

The present invention relates to new and useful improvements in electric cooking apparatus, but more particularly to a device of this character for making waffles.

An important object of the present invention is to provide an apparatus of this character for simultaneously make a large number of waffles and including upper and lower electrically heated baking grids, the upper grids being connected to each other for movement as a unit into and out of position on the lower grids, together with means for simultaneously supplying batter to the grids.

A further object of the invention is to provide a batter-filling cart adapted to travel on rails into and out of position over the lower grids, the cart including a reservoir having a plurality of batter-filling wells in its bottom adapted for positioning over the respective grids, together with valve control means for simultaneously depositing batter from the wells onto the grids.

A further object of the invention is to provide an apparatus of this character of simple and practical construction, which is efficient and reliable in operation, which may be manufactured at relatively low cost, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view.

Figure 3 is a vertical transverse sectional view taken substantially on a line 3—3 of Figure 2.

Figure 4 is a similar view taken substantially on a line 4—4 of Figure 2.

Figure 5 is an enlarged fragmentary sectional view taken substantially on a line 5—5 of Figure 1.

Figure 6 is an enlarged fragmentary sectional view of one of the batter-filling wells of the batter cart.

Figure 7 is a sectional view taken substantially on a line 7—7 of Figure 6.

Referring now to the drawings in detail, wherein for the purpose of illustration I have disclosed a preferred embodiment of the invention, the numeral 5 designates a baking table generally which includes an upper baking unit 6 and a lower baking unit 7, each being provided with a plurality of cooperating electric waffle-baking grids 8 and 9, respectively, the present embodiment of the invention illustrating 35 of such waffle-baking grids.

The lower baking unit 7 is supported on legs 10 preferably of tubular construction.

The baking grids 8 and 9 are of conventional construction, and each includes an electric heating element 11 contained in a housing 12 provided with a removable cover 13, the housings and grids being arranged in rows, as illustrated more clearly in Figure 1 of the drawings, and the housings 12 of each row are connected to each other by conduits 14 through which the electric wires for the heating elements may pass.

The electric heating elements for the grids of the upper and lower baking units are controlled by means of a conventional form of switch 15 including thermostatic control means.

A pair of rods 16 are connected at their upper ends to the rear edges of the upper baking unit 6 adjacent each end thereof, the rods 16 extending downwardly and are connected adjacent their lower ends to collars 17 slidably mounted on the rear legs 10 of the table.

A U-shaped lever 18 is pivotally attached at its ends to the collars 17 by means of pins 19, the legs of the lever projecting forwardly and pivotally connected intermediate their ends to the under side of the lower baking unit 7 by means of links 20.

The bight portion of the lever 18 projects longitudinally in front of the table to provide a hand grip for manipulating the lever to raise and lower the upper baking unit 6, as indicated by the full and dotted line positions in Figure 3 of the drawings.

A cross bar 21 is connected to the legs of the lever 18 and on which one or more counter-weights 22 may be placed to maintain the upper baking unit in its vertically adjusted position.

A pair of rails 23 extend longitudinally at the front and rear sides of the lower baking unit 7 and extend outwardly from the end of the table opposite from the control switches 15, the outer ends of the rails being supported on legs 24.

A batter-filling cart is designated generally at 25 and includes a flat reservoir 26 mounted on wheels 27 adapted to ride on the rails 23 into and out of position overlying the lower baking unit 7 when the upper baking unit 6 is raised.

A plurality of batter wells 27 extend downwardly from the bottom of the reservoir 26. Each well 27, as particularly illustrated in Figures 6 and 7, comprises a hollow, cylindrical body 28 secured at its upper end to the under surface of the bottom wall 29 of the reservoir 26 surrounding a respective aperture in the bottom wall and is provided at each end with internal screw threads. The upper and lower ends of the cylindrical body are closed by respective end-closure caps 30 and 31 each having an externally screw-threaded boss 32 thereon, said bosses being threaded into the corresponding internally screw-threaded ends of body 28. Each cap 30 and 31 has a central aperture 33 constituting a valve port and the inner edge of which provides a seat for ball valve 34 which is operatively engageable with either the upper or lower valve seat in a manner which will presently appear.

The cylindrical body 28 and end closure caps 31 provide a receptacle of predetermined internal capacity for metering the quantity of batter applied to the corresponding baking grid.

A stem 35 extends upwardly from ball valve 34 and is pivotally connected at its upper end to one corner of a triangular or bell crank lever 36, another corner of which is pivotally mounted on an apertured lug 37 projecting upwardly from the top closure cap 31.

The wells 27 are arranged in rows and correspond in position to the positions of the lower baking grids 9.

A number of rods 38 corresponding to the number of rows of wells 27 extend through the reservoir 26, one above each row of wells, are slidably mounted in the reservoir structure and project therefrom at one end.

Each rod passes through a number of sleeves 39 corresponding to the number of wells in each row, each sleeve being positioned above a corresponding well and in alignment with the third or upper corner of the corresponding triangular or bell crank lever 36.

Each sleeve is mounted between a pair of coiled compression springs 40 which surround the rod and bear at their outer ends against respective abutment washers 41 which surround and are secured to the rods. Each sleeve 39 is pivotally connected to its corresponding lever 36 by suitable means, such as a pivot pin 42.

A handle 43 is connected to the projecting ena of each rod 38 and extends outwardly therefrom. A bracket 44 is positioned below each handle and secured to the corresponding end of reservoir 26, each bracket having an aperture adjacent the outer end thereof.

A spring guide or toggle lever 45 is pivotally secured at its upper end to each handle 43 and extends downwardly through the aperture in the corresponding bracket, and a coiled compression spring 46 surrounds each toggle lever between the corresponding handle and bracket.

The action of these toggle devices is to resiliently move the handles to and retain them in either their inner or outer-limiting positions relative to the corresponding end of the batter reservoir.

With the above construction, when a handle is forced to its inward position all of the ball valves connected to the corresponding rod 38 are forced downwardly in the respective wells 27 to seat on the lower end cap 31 closing the ports 33 therein. The compression springs 40 on the handle sides of the corresponding sleeves 39 will hold the ball valves firmly in contact with the lower valve seats and batter may then flow into the wells from the reservoir through the valve ports in the upper end cap. If now the batter cart containing the reservoir be positioned so that the wells are over corresponding lower baking grids 9 and one or more of the handles 43 pulled out to the outer limiting position thereof, the corresponding ball valves will be raised from contact with the lower end cap and brought into contact with the underside of the upper end cap closing the ports 33 in the upper cap. The predetermined quantity of batter in each well will then flow through the ports 33 in the lower end cap onto the corresponding lower baking grid. As the corresponding toggle device holds the rod in its outward position and the compression springs 40 at the sides of sleeve 39 act to firmly seat the ball valves on the valve seats at the inner ends of the upper end cap, no additional batter can flow into the wells until the handles 43 are again forced inwardly to refill the wells.

Means are thus provided for accurately and automatically metering the quantity of batter used for each article cooked by the improved apparatus.

In the operation of the device, when it is desired to supply the lower grids 9 with batter, the upper baking unit 6 is raised by the lever 18 and the batter cart 25 moved along the rails 23 into a position over the lower baking unit 7 and with the wells 27 positioned immediately above the grid. One or more of the handles 43 are then pulled rearwardly or outwardly to cause a rearward sliding movement of the rods 38 which thus will swing the front end of the bell crank levers 36 upwardly to raise the valves 34 and permit the batter to be discharged from the wells onto the grids.

All of the lower grids 9 or any one row thereof are thus simultaneously supplied with a quantity of the batter and the handles 43 are then moved forwardly to close the valves 34 after which the cart 25 is then moved rearwardly on the rails 23 into the position shown in Figure 2 of the drawings and the upper baking unit 6 is then lowered into position and the baking of the waffles then proceeds.

In view of the foregoing description taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claims.

Having thus described the invention, what I claim is:

1. A batter cart for use with baking apparatus including a fixed baking unit having a plurality of baking grids, arranged in side by side relationship, a pair of rails extending along opposite sides of said fixed unit and to one side thereof, said batter cart being mounted on said rails and movable from a position at one side of said fixed unit to a position directly above said fixed unit; and including means for supplying a predetermined quantity of batter to each grid of said fixed baking unit while the batter cart is positioned thereabove, said means comprising a flat reservoir in said cart having an apertured bottom wall, a plurality of wells secured to and positioned below said bottom wall surrounding respective bottom-wall apertures, said wells being of a predetermined capacity and having upper and lower end closures with valve ports therein, a movable valve in each well operative to close either the upper or lower valve port therein, and manually-operated means including a plurality of rods extending through said reservoir and each operatively connected with a respective group of said movable valves to move said valves between said lower and upper valve ports and having handles carried by said cart and connected respectively to said rods for selectively moving the valve groups.

2. A movable batter cart for baking apparatus, said cart comprising, a flat reservoir, wheels supporting said cart for movement relative to a fixed apparatus part, batter wells of predetermined internal capacity mounted at the under-side of said reservoir and communicating therewith, means providing a valve port at the lower end and a valve port at the upper end of each well, a movable valve in each well alternatively closing the corresponding upper and lower valve ports, and manually-operated means extending through said reservoir and operatively connected with said movable valves, said valves being operative to meter a predetermined quantity of batter through the respective wells upon operation of said manually-operated means and said manually operated means including separately operated assemblies connected respectively to different groups of said valves for selectively operating such valve groups.

ALLY BAKER.

REFERENCES CITED

The following references are of record in the file of this patent:

UNITED STATES PATENTS

| Number | Name | Date |
|---|---|---|
| 502,969 | Jackson | Aug. 8, 1893 |
| 677,815 | Sutton | July 2, 1901 |
| 841,211 | Abrahams | Jan. 15, 1907 |
| 841,533 | Kawasaki | Jan. 15, 1907 |
| 1,151,548 | Rumple | Aug. 24, 1915 |
| 1,245,008 | Moore | Oct. 30, 1917 |
| 1,310,990 | Hauge et al. | July 22, 1919 |
| 1,446,532 | Wolcott | Feb. 27, 1923 |
| 1,493,925 | DuCharme | May 13, 1924 |
| 1,595,822 | DuCharme | Aug. 10, 1926 |
| 1,628,310 | De Roos | May 10, 1927 |
| 1,824,362 | Noeth et al. | Sept. 22, 1931 |
| 1,856,864 | Claus | May 3, 1932 |
| 1,939,017 | Naeve | Dec. 12, 1933 |